US010394945B2

(12) United States Patent
Hsu

(10) Patent No.: US 10,394,945 B2
(45) Date of Patent: Aug. 27, 2019

(54) WEBPAGE ANNOTATION AND COMMUNITY SHARING SYSTEM

(71) Applicant: JUMBO TECHNOLOGY CO., LTD., Taichung (TW)

(72) Inventor: Shun-Tsung Hsu, Taichung (TW)

(73) Assignee: Jumbo Technology Co., Ltd., Taichung (TW)

(*) Notice: Subject to any disclaimer, the term of this patent is extended or adjusted under 35 U.S.C. 154(b) by 0 days.

(21) Appl. No.: 15/741,718

(22) PCT Filed: Nov. 17, 2015

(86) PCT No.: PCT/CN2015/094772
§ 371 (c)(1),
(2) Date: Jan. 3, 2018

(87) PCT Pub. No.: WO2017/084021
PCT Pub. Date: May 26, 2017

(65) Prior Publication Data
US 2018/0196793 A1 Jul. 12, 2018

(51) Int. Cl.
G06F 17/00 (2019.01)
G06F 17/24 (2006.01)
G06F 16/955 (2019.01)
G06F 16/00 (2019.01)

(52) U.S. Cl.
CPC ............ *G06F 17/241* (2013.01); *G06F 16/00* (2019.01); *G06F 16/9566* (2019.01)

(58) Field of Classification Search
CPC .................................................... G06F 17/241
See application file for complete search history.

(56) References Cited

U.S. PATENT DOCUMENTS 8,190,990 B2* 5/2012 Le ..................... G06F 17/30882
715/230
8,332,408 B1* 12/2012 Rudary ............. G06F 17/30899
707/737

(Continued)

FOREIGN PATENT DOCUMENTS

CN 101441644 A 5/2009
CN 102833277 A 12/2012
WO WO2011019296 A1 2/2011

*Primary Examiner* — Laurie A Ries
(74) *Attorney, Agent, or Firm* — Muncy, Geissler, Olds & Lowe, P.C.

(57) ABSTRACT

The present invention is a webpage annotation and community sharing system; said system is installed and runs on a smart computer device such that a user may annotate text descriptions to a webpage; the system contains a webpage browsing element, a webpage segmentation element, and an annotation element; the webpage browsing element displays the webpage, the webpage segmentation element divides the webpage into upper and lower webpage panes according to the annotation points provided by the user and forms an annotation space between the two webpage panes, and the annotation element is used for annotating the text description in the annotation space; accordingly, the annotation space is formed using the means of upper and lower separation, thus annotation is easy and may be conveniently used on a smart computer device having a small screen, satisfying requirements of use.

5 Claims, 7 Drawing Sheets

(56) References Cited

U.S. PATENT DOCUMENTS

| | | | | |
|---|---|---|---|---|
| 8,572,475 | B2* | 10/2013 | Chikyu | G06F 17/241 715/230 |
| 8,880,540 | B1* | 11/2014 | Sampson | G06K 9/00463 707/756 |
| 9,569,721 | B1* | 2/2017 | Lee | G06N 3/08 |
| 2003/0081000 | A1* | 5/2003 | Watanabe | G06F 17/241 715/751 |
| 2004/0019849 | A1* | 1/2004 | Weng | G06F 17/24 715/255 |
| 2006/0048047 | A1* | 3/2006 | Tao | G06F 17/241 715/232 |
| 2007/0043617 | A1* | 2/2007 | Stein | G06Q 30/02 705/14.64 |
| 2007/0118794 | A1* | 5/2007 | Hollander | G06F 17/241 715/205 |
| 2008/0178096 | A1* | 7/2008 | Kusuda | H04L 12/66 715/758 |
| 2008/0201651 | A1* | 8/2008 | Hong | G06F 17/30722 715/764 |
| 2009/0177959 | A1* | 7/2009 | Chakrabarti | G06F 17/2229 715/234 |
| 2009/0265607 | A1* | 10/2009 | Raz | G06F 17/2288 715/233 |
| 2010/0325557 | A1* | 12/2010 | Sibillo | G06F 3/0481 715/751 |
| 2012/0005686 | A1* | 1/2012 | Rajan | G06F 17/2241 718/105 |
| 2012/0192093 | A1* | 7/2012 | Migos | G06F 3/04883 715/773 |
| 2012/0284642 | A1* | 11/2012 | Sitrick | G06F 17/2288 715/753 |
| 2013/0111395 | A1* | 5/2013 | Ying | G06F 3/0483 715/783 |
| 2013/0185657 | A1* | 7/2013 | Gunawardena | G06F 16/48 715/753 |
| 2014/0181694 | A1* | 6/2014 | Barman | G06Q 50/01 715/753 |
| 2014/0201178 | A1* | 7/2014 | Baecke | G06F 17/30038 707/706 |
| 2014/0298152 | A1* | 10/2014 | Malla | G06F 17/241 715/230 |
| 2015/0073923 | A1* | 3/2015 | Hafeez | G06Q 30/0277 705/14.73 |
| 2015/0074517 | A1* | 3/2015 | Wang | G06F 3/0483 715/234 |
| 2015/0100874 | A1* | 4/2015 | Pallakoff | G06F 17/241 715/232 |
| 2016/0203114 | A1* | 7/2016 | Karalis | H04L 67/02 715/230 |
| 2016/0232144 | A1* | 8/2016 | Zhou | H04L 67/34 |
| 2018/0109843 | A1* | 4/2018 | Chang | H04N 21/4332 |

\* cited by examiner

WEBPAGE ANNOTATION AND COMMUNITY SHARING SYSTEM

FIELD OF THE INVENTION

The present invention relates to web browsing, and more particularly to a webpage annotation and community sharing system.

BACKGROUND OF THE INVENTION

Smart computer devices such as a smartphone, a tablet computer are portable devices necessary for people when they go out. With the use of wireless networking technologies such as network communication technology of 4G or 3G, the smart computer devices allow users to surf the Internet anywhere and anytime to obtain information in real time, so that the users can work online to proceed with their official businesses and private affairs or social network activities.

Network activities, such as browsing the webpage, have the advantages of being independent of the location, privacy and real-time operation, and have been widely used in the access of information, managing official businesses, home shopping, etc. However, when users have questions about the information or the operation, the users can only find out by themselves without customer support personnel for consultation, or consult over the phone, which takes time and is not efficient.

In the prior art, there are some solutions to make customer support personnel readily understand the users' questions or to share the annotations or tips for the specific webpage between friends. For example, China Patent No. 102833277 A, titled "Method and system for sharing web link", discloses a system and a method which comprises adding extended information on a browsed webpage by a first mobile terminal and sending the extended information and a web link of the webpage to a second mobile terminal, and opening the webpage by the second mobile terminal based on the web link and displaying the extended information on the webpage; and further discloses, in the description, that the extended information including a comment, a note and a text/image is highlighted and the extended information is displayed by using different colors, line thicknesses, font formats and font frame background colors according to requirements.

Additionally, China Patent No. 101441644 B, titled "Webpage annotation system and method", discloses a system and a method in which a webpage is opened as a bottom-layer webpage on which a layer of Extensible Markup Language (XML) vector graphic webpage annotations including annotation layers created by the users is overlaid; and each user can create their own annotation layers on the same webpage to form a multi-layer vector graphic annotation overlaid on the same bottom-layer webpage. A user may simply share and send the website of the bottom-layer webpage and the annotation layer created by the user to an object of interest when the user needs to share webpage annotations with other users. In the situation where the user may alter an annotation layer, other users only need to update the altered annotation layer without a copy of the entire file for co-editing in a more efficient way of updating difference.

The technologies as described above both enable the user to make annotations of webpage and to write down the questions for consultation or tips so as to deliver them to the specified persons (e.g., customer support personnel or friends). However, the technology disclosed in China Patent No. 102833277 A only involves directly annotating on the webpage, so that the users can only annotate in a blank space of the webpage; and as a result, the annotations are disorderly, difficult to read, and particularly difficult to identify when the annotations are made or who annotates.

Furthermore, China Patent No. 101441644 B discloses a multi-layer annotation graphic webpage, so it is possible to quickly identify who annotates. However, for a smart computer device with a small-sized screen, it is difficult to perform such complex operations of annotation and reading and editing, causing problems in both annotation and reading, which obviously cannot meet the requirements of use.

SUMMARY OF THE INVENTION

The main objective of the present invention is to provide a webpage annotation and community sharing system. The webpage annotation and community sharing system allows for a very simple operation of annotation and is easy to use, and is suitable for a smart computer device with a small-sized screen.

Based on the above objective, the present invention relates to a webpage annotation and community sharing system which is installed and runs on a smart computer device for a user to annotate text descriptions to a webpage. The webpage annotation and community sharing system comprises a webpage browsing element configured to display the webpage; a webpage segmentation element configured to divide the webpage into upper and lower webpage panes according to annotation points provided by the user to form an annotation space between the two webpage panes; and an annotation element configured to annotate the text descriptions in the annotation space.

In the present invention, the webpage is divided into the upper and lower webpage panes by the webpage segmentation element to form the annotation space, such that the text descriptions can be easily annotated in the annotation space; and accordingly, problems would not exist in reading the annotation when shared with others. Therefore, the present invention is useful for a smart computer device with a small-sized screen to meet the requirements of use.

DETAILED DESCRIPTION OF THE PREFERRED EMBODIMENTS

Figure 1:
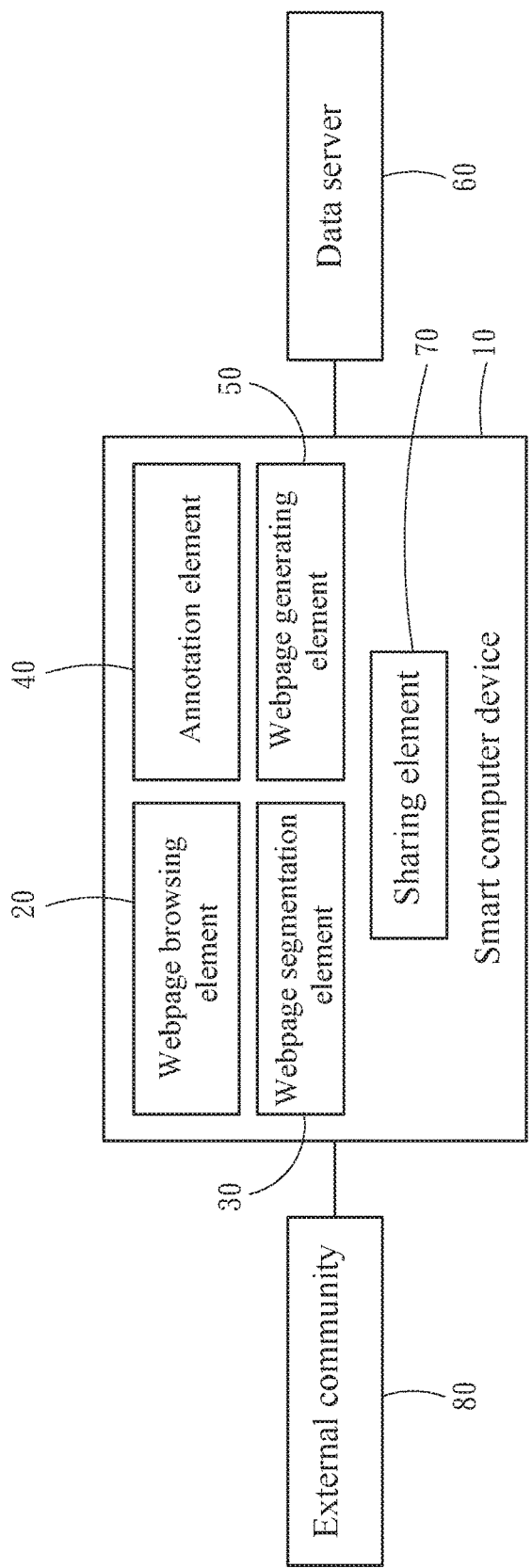
FIG. 1 is a schematic diagram of a first embodiment of the present invention.
Figure 2:
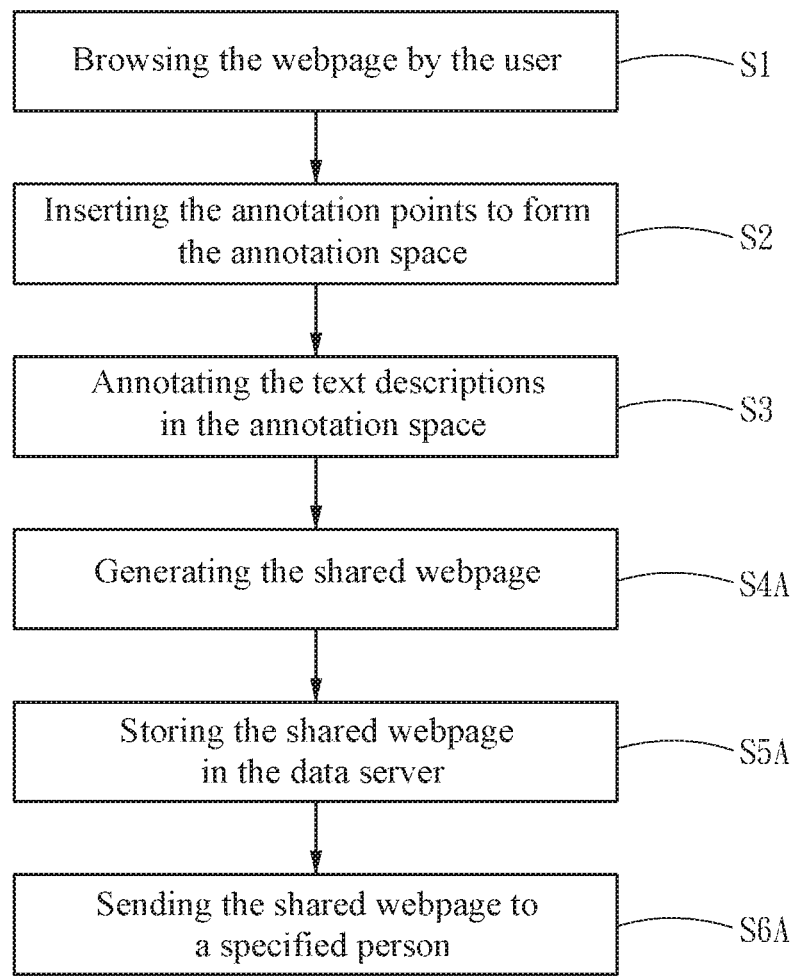
FIG. 2 is a flowchart of the operation of the first embodiment of the present invention.

The present invention will be further described in detail with reference to the embodiments. However, it should be understood that these embodiments are merely illustrative and not intended to limit the implementations of the present invention.

Referring to FIG. 1, FIG. 2 and FIG. 3A, FIG. 3B and FIG. 3C, the first embodiment of the present invention is a webpage annotation and community sharing system, which is installed and runs on a smart computer device 10 for a user to annotate text descriptions 41 to a webpage 21. The webpage annotation and community sharing system comprises a webpage browsing element 20, a webpage segmentation element 30 and an annotation element 40. The operation of the first embodiment is illustrated as steps S1, S2, S3, S4A, S5A and S6A, as described below.

Step S1: browsing the webpage 21 by the user; the webpage browsing element 20 is configured to display the webpage 21 for the user to browse.

Step S2: inserting annotation points 31 to form an annotation space 23.

Figure 3A:
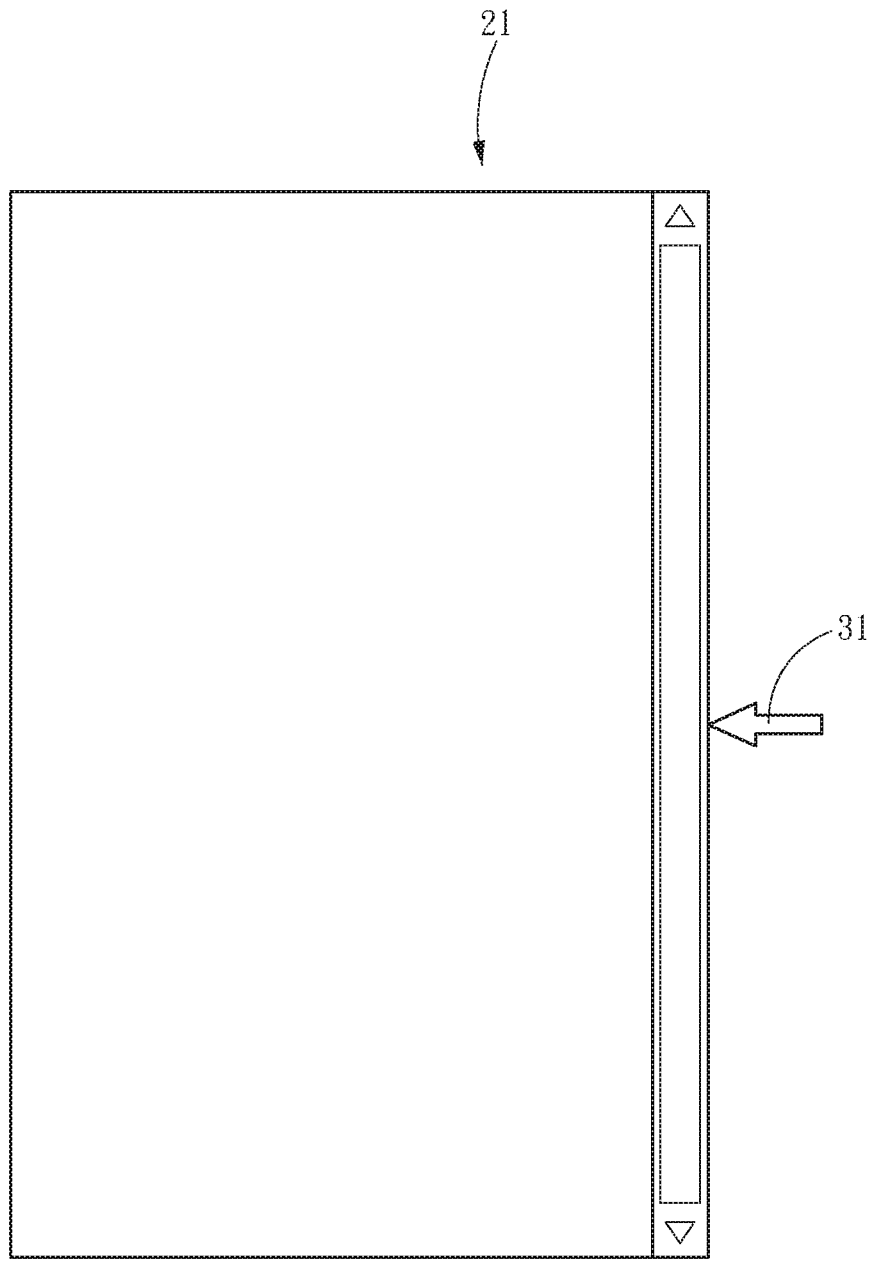
FIGS. 3A to 3C schematically show the divided webpage according to the first embodiment of the present invention.
Figure 3B:
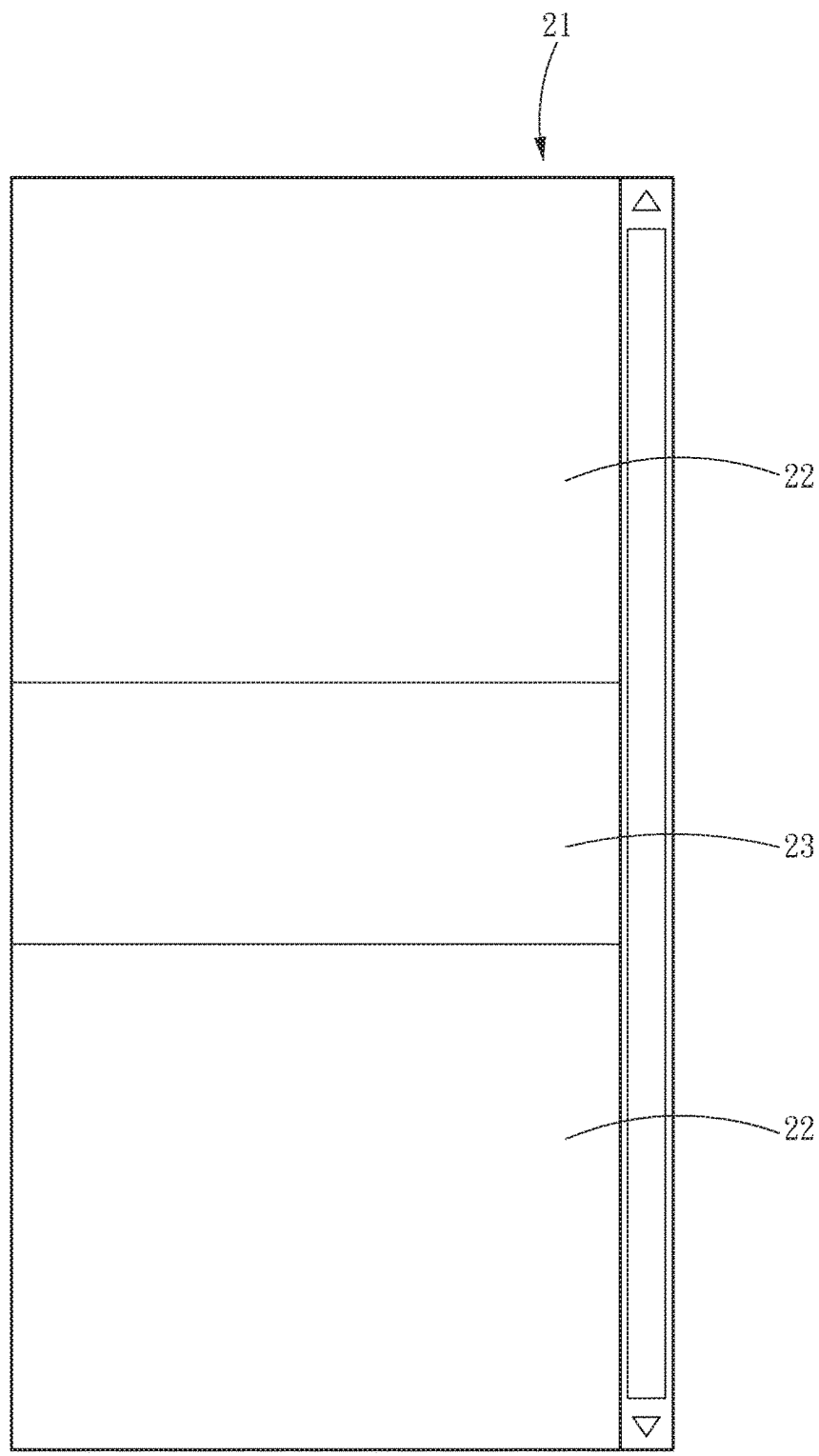
Figure 3C:
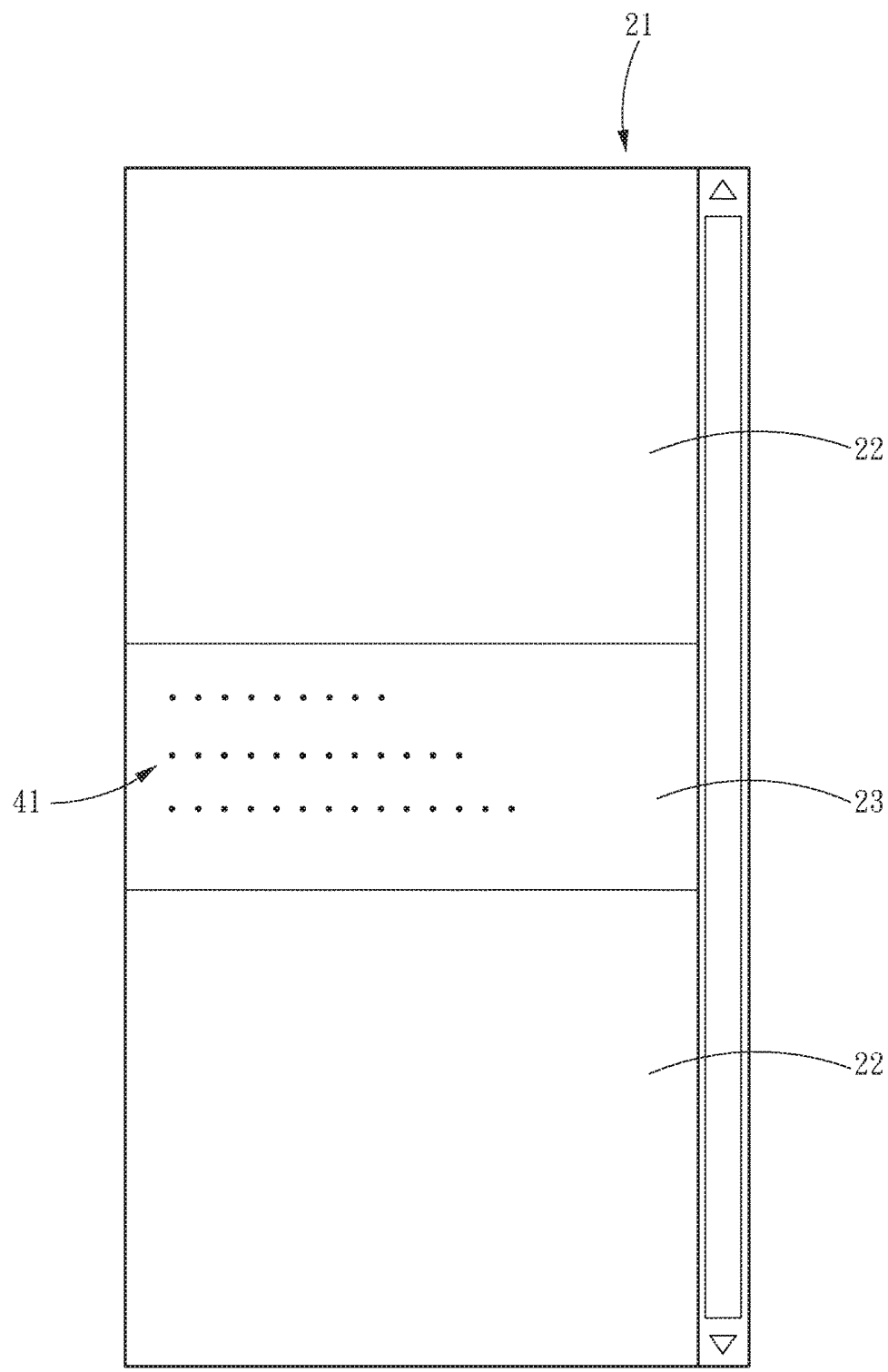

Step S3: annotating the text descriptions 41 in the annotation space 23; the webpage segmentation element 30 divides the webpage 21 into upper and lower webpage panes 22 according to the annotation points 31 (as shown in FIG. 3A) provided by the user to form the annotation space 23 between the two webpage panes 22 (as shown in FIG. 3B); and the annotation element 40 is configured to annotate the text descriptions 41 in the annotation space 23 (as shown in FIG. 3C).

Step S4A: generating a shared webpage; this embodiment further comprises a webpage generating element 50 which is configured to integrate the two webpage panes 22 with the annotation space 23 to form the shared webpage.

Step S5A: storing the shared webpage in a data server 60; the smart computer device 10 is connected to the data server 60 which is configured to store the shared webpage and provide the shared webpage with a linked Uniform Resource Locator (URL).

Step S6A: sending the shared webpage to a specified person; the specified person may acquire the linked URL to view the webpage panes 22 (i.e., the contents of the webpage 21) and the annotation space 23 (i.e., the text descriptions 41) when the linked URL is shared from the user with the specified person. This embodiment further comprises a sharing element 70 for sharing the linked URL. The user may share the linked URL through the sharing element 70 to at least one specified person in an external community 80, allowing the at least one specified person to connect to the data server 60 to access the shared webpage.

Figure 4:
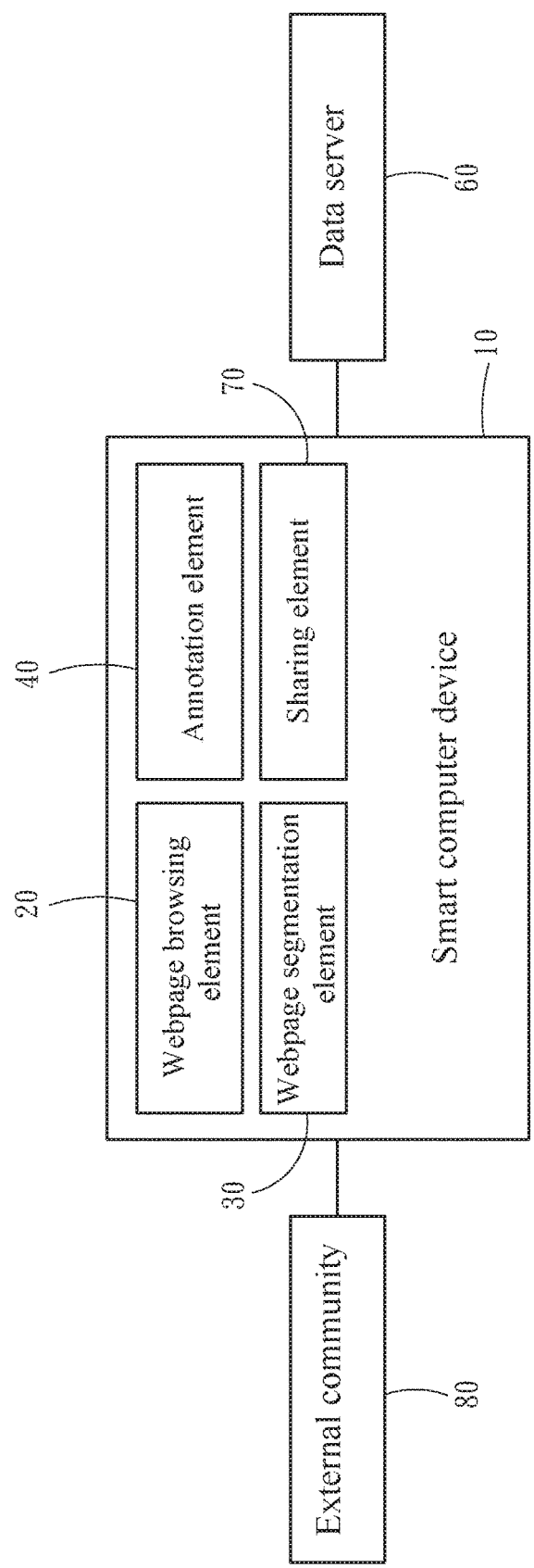
FIG. 4 is a schematic diagram of a second embodiment of the present invention.
Figure 5:
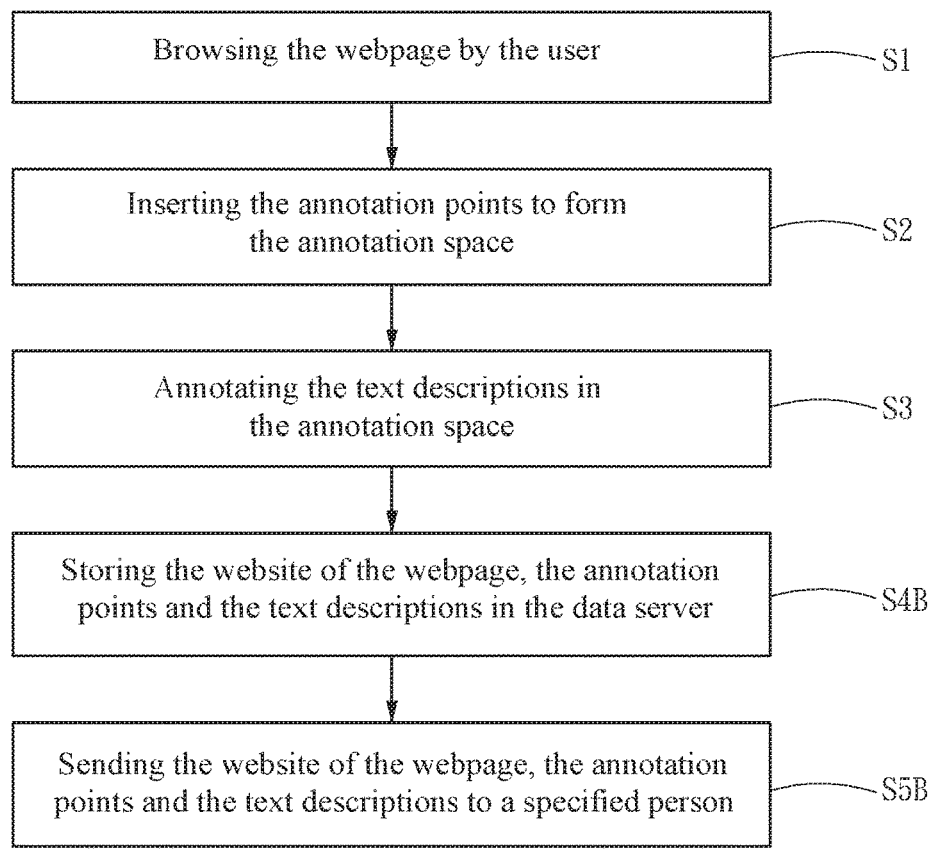
FIG. 5 is a flowchart of the operation of the second embodiment of the present invention.

Referring to FIG. 4 and FIG. 5, the operation of the second embodiment of the present invention includes: browsing the webpage 21 by the user (step S1); inserting annotation points 31 to form an annotation space 23 (step S2); annotating text descriptions 41 in the annotation space 23 (step S3); storing the website of the webpage 21, the annotation points 31 and the text descriptions 41 in the data server 60 (step S4B); and sending the website of the webpage 21, the annotation points 31 and the text description 41s to the specified person (step S5B).

The data server 60 of the second embodiment is configured to store and integrate the website of the webpage 21, the annotation points 31 and the text descriptions 41 to form a download link, as compared to the first embodiment; in other words, the website of the webpage 21, the annotation points 31 and the text descriptions 41 may be accessed upon accessing the download link. The second embodiment is also provided with a sharing element 70 such that the user may share the download link through the sharing element 70 to at least one specified person in an external community 80, allowing the at least one specified person to connect to the data server 60 to access the download link and then to acquire the website of the webpage 21, the annotation points 31 and the text descriptions 41.

As such, the webpage 21 which is annotated by the user may be reproduced when the website of the webpage 21, the annotation points 31 and the text descriptions 41 are obtained by the specified person, then the website of the webpage 21 is accessed through a software to view the contents of the webpage 21, the webpage 21 is divided at a segmentation position indicated by the annotation points 31 and the text descriptions 41 is inserted. Accordingly, the data usage of the data server 60 may be reduced, and meanwhile, the concern in terms of patent infringement due to the copyright of the contents of the webpage 21 may be eliminated.

As described above, in the present invention, the webpage is divided into the upper and lower webpage panes by the webpage segmentation element to form the annotation space, such that the text descriptions can be readily annotated in the annotation space; and accordingly, problems would not exist in reading the annotation when shared with the specified persons. Therefore, the present invention is suitable for a smart computer device with a small-sized screen, so as to overcome the difficulties in the operation of the smart computer device with a small-sized screen in the prior art, thus meeting the requirements of use.

What is claimed is:

1. A webpage annotation and community sharing system for a user to annotate text descriptions to a webpage, comprising:
    a webpage browsing element, displaying the webpage which includes a plurality of data;
    a webpage segmentation element, retrieving the plurality of data from the webpage browsing element, the webpage segmentation element including at least one annotation point inserted into the plurality of data to divide the plurality of data into an upper data segment and a lower data segment and to define an annotation space between the upper data segment and the lower data segment;
    an annotation element, connected with the webpage browsing element and the webpage segmentation element, the annotation element receiving the text descriptions from the user and converting the text descriptions into an annotation data which is transmitted to the webpage segmentation element and the webpage browsing element, wherein the webpage segmentation element inserts the annotation data into the annotation space, and the webpage browsing element integrates the annotation data with the plurality of data to displayed on the webpage; and
    a webpage generating element, integrating the webpage which includes the annotation data and the plurality of data with the annotation space to form a shared webpage.

2. The webpage annotation and community sharing system of claim 1, wherein the webpage annotation and community sharing system is installed and runs on a smart computer device that is connected to a data server for storing the shared webpage and providing the shared webpage with a linked URL.

3. The webpage annotation and community sharing system of claim 2, wherein the webpage annotation and community sharing system further comprises a sharing element, and the user shares the linked URL through the sharing element to at least one specified person in an external community, allowing the at least one specified person to connect to the data server to access the shared webpage.

4. The webpage annotation and community sharing system of claim 1, wherein the webpage annotation and community sharing system is installed and runs on a smart computer device that is connected to a data server for storing and integrating a website of the webpage, the annotation points and the text descriptions to form a download link.

5. The webpage annotation and community sharing system of claim 4, wherein the webpage annotation and community sharing system further comprises a sharing element, and the user shares the download link through the sharing element to at least one specified person in an external community, allowing the at least one specified person to connect to the data server to access the download link and then to acquire the website of the webpage, the annotation points and the text descriptions.

\* \* \* \* \*